United States Patent [19]
von Ahrens

[11] Patent Number: 4,652,019
[45] Date of Patent: * Mar. 24, 1987

[54] PARTIALLY CONSUMABLE SPACER CHILL RING

[75] Inventor: Roger W. von Ahrens, Colonia, N.J.

[73] Assignee: Robvon Backing Ring Company, Avenel, N.J.

[*] Notice: The portion of the term of this patent subsequent to Sep. 16, 2003 has been disclaimed.

[21] Appl. No.: 827,250

[22] Filed: Feb. 7, 1986

Related U.S. Application Data

[63] Continuation-in-part of Ser. No. 587,492, Mar. 9, 1984, Pat. No. 4,611,830, which is a continuation-in-part of Ser. No. 241,715, Mar. 9, 1981, abandoned.

[51] Int. Cl.[4] .............................................. F16L 13/02
[52] U.S. Cl. ...................................... 285/22; 285/286; 228/250
[58] Field of Search .................. 285/22, 286; 228/250

[56] References Cited

U.S. PATENT DOCUMENTS

| | | | |
|---|---|---|---|
| 1,453,343 | 5/1923 | Fay | 285/22 X |
| 1,499,581 | 7/1924 | Kibele | 285/286 |
| 1,980,530 | 11/1934 | Hutchison | 285/286 X |
| 1,981,850 | 11/1934 | Fisher | 285/22 X |
| 1,987,341 | 1/1935 | Kachel | 285/22 X |
| 2,028,233 | 1/1936 | Naeder | 113/112 |
| 2,206,375 | 7/1940 | Swift | 219/10 |
| 2,366,579 | 1/1945 | von Ahrens | 285/22 |
| 2,731,933 | 1/1956 | Phillips | 113/111 |
| 2,764,426 | 9/1956 | von Ahrens | 285/22 |
| 2,792,490 | 5/1957 | Risch et al. | 285/22 X |
| 3,001,497 | 9/1961 | Thielsch | 113/136 |
| 3,002,191 | 9/1961 | Thielsch | 29/493 |
| 3,033,145 | 5/1962 | Thielsch | 285/22 X |
| 3,068,827 | 12/1962 | Norcross | 113/110 |
| 3,151,888 | 10/1964 | Wagner | 285/22 |
| 3,290,772 | 12/1966 | Crouch | 29/493 |
| 3,461,543 | 8/1969 | Nakakubo et al. | 29/498.5 |
| 3,639,724 | 2/1972 | Gerath | 219/137 |
| 3,770,302 | 11/1973 | Hallenbeck | 285/22 |
| 3,895,924 | 7/1975 | Hallenbeck | 29/183 |
| 4,103,940 | 8/1978 | Bills | 285/189 |
| 4,135,739 | 1/1979 | Mackenzie | 285/22 |
| 4,335,906 | 1/1982 | Cardinale et al. | 285/22 |

FOREIGN PATENT DOCUMENTS

| | | | |
|---|---|---|---|
| 202285 | 4/1939 | Switzerland | 285/286 |

Primary Examiner—Thomas F. Callaghan
Attorney, Agent, or Firm—David A. Jackson

[57] ABSTRACT

A partially consumable spacer chill ring for welding a pair of adjacent pipe ends together, includes a non-consumable, substantially annular, base metal ring having an outer surface with an outside diameter permitting a snug fit interiorly of the pipe ends to be welded, the non-consumable base metal ring being effectively continuous with at most a small transverse slit; and a consumable, substantially annular, filler metal spacer ring medially attached to the outer surface of the base ring and projecting radially outwardly therefrom, for spacing apart and for welding the pipe ends together by supplying filler metal from the consumable spacer ring to the weld during a first root pass of a welding operation, the consumable filler metal ring having, in cross-section, a radial leg extending medially with respect to and radially outwardly from the outer surface of the base metal ring, and two opposite, transverse legs extending on opposite sides of the radial leg and positioned on the outer surface of the base metal ring, so as to provide, in cross-section, an inverted "T" shape or an inverted cross shape.

7 Claims, 4 Drawing Figures

PARTIALLY CONSUMABLE SPACER CHILL RING

REFERENCE TO RELATED APPLICATION

This Application is a Continuation-In-Part of U.S. patent application Ser. No. 06/587,492, filed Mar. 9, 1984, now U.S. Pat. No. 4,611,830 to to Roger W. von Ahrens for Partially Consumable Spacer Chill Rings and Their Use In Welding Pipe Joints which, in turn, is a Continuation-In-Part of U.S. patent application Ser. No. 06/241,715, filed Mar. 9, 1981, to Roger W. von Ahrens for Consumable Spacer Chill Ring.

BACKGROUND OF THE INVENTION

This invention relates generally to welding chill rings for joining adjacent lengths of metal pipes and, more particularly, is directed to a partially consumable spacer chill ring with pipe alignment and separation means.

It is common practice in the welding industry to employ a chill ring to facilitate the introduction of filler material from a separate source during the first root pass, when welding two pipe ends together. Specifically, the chill ring is constructed of a non-consumable metal ring which is inserted within the pipe ends. Spacer pins are usually employed in conjunction with the chill ring to precisely set the distance between adjacent pipe ends for better control and reliability in the pipe joining operation. However, there is a need to provide a separate source of welding material for the first root pass during the welding operation. Thus, use of such chill rings involves manual welding procedures, which are always subject to human error, due to the wide variance possible in the welder's flow of filler material. Examples of such chill rings can be found in U.S. Pat. Nos. 2,366,579 and 2,764,426.

In order to compensate for the above, totally consumable spacer rings have been used which function to provide the consumable welding material for welding, at least during the first root pass, and which also function to separate and align the pipe ends. Examples of such consumable spacer rings can be found in U.S. Pat. Nos. 1,981,850; 2,792,490; 3,068,827; and 4,335,906, and Swiss Pat. No. 202,285.

The problem with using a totally consumable welding ring, however, is that a gas must be pumped into the interior of the pipes to maintain a positive pressure so as to prevent dripping of the liquified consumable metal within the pipes. Such dripping results in the formation of undesirable icicle-like structures within the pipes. The requirement of adding and maintaining gas within the interior of the pipes makes the welding operation relatively complicated and adds further difficulties, such as removal of the gas and the like. For example, aforementioned U.S. Pat. No. 2,792,490 discloses the use of Argon or other suitable inert gas introduced from a cylinder through a conduit into the interior of the pipes when a totally consumable ring is used.

In order to solve the above problems, the applicant herein has proposed using a combination non-consumable base metal ring surrounded by a consumable filler metal spacer ring, the latter spacing apart the metal pipe ends and providing the welding material for at least the first root pass. Such partially consumable spacer chill rings are described in copending U.S. patent application Ser. Nos. 06/587,492 and 06/241,715, the entire disclosures of which are incorporated herein by reference.

However, with the partially consumable spacer chill ring according to these U.S. patent applications, the consumable ring is relatively narrow. As a result, the pipe ends are extremely close to each other, separated by a small gap having dimensions equal to that of the consumable ring. As a result, during a first root pass of the welding operation, much of the applied heat is drawn away from the weld area by the pipes. With such heat being drawn away, it thereby beomes more difficult to melt the weld material. In addition, there may be an uneven flow of material, resulting in cracking and porosity in the weld.

Other types of welding rings are disclosed in U.S. Pat. Nos. 1,980,530; 2,028,233; 2,206,375; 2,731,933; 3,001,497; 3,002,191; 3,290,772; 3,461,543; 3,639,724; 3,895,924; 4,103,940; and 4,135,739.

OBJECTS AND SUMMARY OF THE INVENTION

Accordingly, it is an object of the present invention to provide a partially consumable spacer chill ring that avoids the above described difficulties.

More particularly, it is an object of the present invention to provide a partially consumable spacer chill ring that provides improved heat dissipation during the first root pass of a welding operation.

It is another object of the present invention to provide a partially consumable spacer chill ring that provides more even heat dissipation during the first root pass of a welding operation.

It is still another object of the present invention to provide a partially consumable spacer chill ring that provides more even flow of material during the first root pass of a welding operation.

It is yet another object of the present invention to provide a partially consumable spacer chill ring that provides quicker melting of the consumable ring with less heat.

It is a further object of the present invention to provide a partially consumable spacer chill ring with reduced cracking and porosity of the weld.

It is a still further object of the present invention to provide a partially consumable spacer chill ring that provides better penetration of the non-consumable ring and the pipe ends during the first root pass of a welding operation.

In accordance with an aspect of the present invention, a partially consumable spacer chill ring for welding a pair of adjacent pipe ends together, includes a non-consumable substantially annular, base metal ring having an outer surface with an outside diameter permitting a snug fit interiorly of the pipe ends to be welded; and a consumable, substantially annular, filler metal spacer ring medially attached to the outer surface of the base ring and projecting radially outwardly therefrom, for spacing apart and for welding the pipe ends together by supplying filler metal from the consumable spacer ring to the weld during a first root pass of a welding operation, the consumable filler metal ring having, in cross section, a radial leg extending medially with respect to and radially outwardly from the outer surface of the base metal ring, and two opposite, transverse legs extending on opposite sides of the radial leg and positioned around the outer surface of the base metal ring.

The above and other objects, features and advantages of the present invention will become readily apparent from the following detailed description thereof which is to read in connection with the accompanying drawings.

DETAILED DESCRIPTION OF THE PREFERRED EMBODIMENTS

Figure 1:
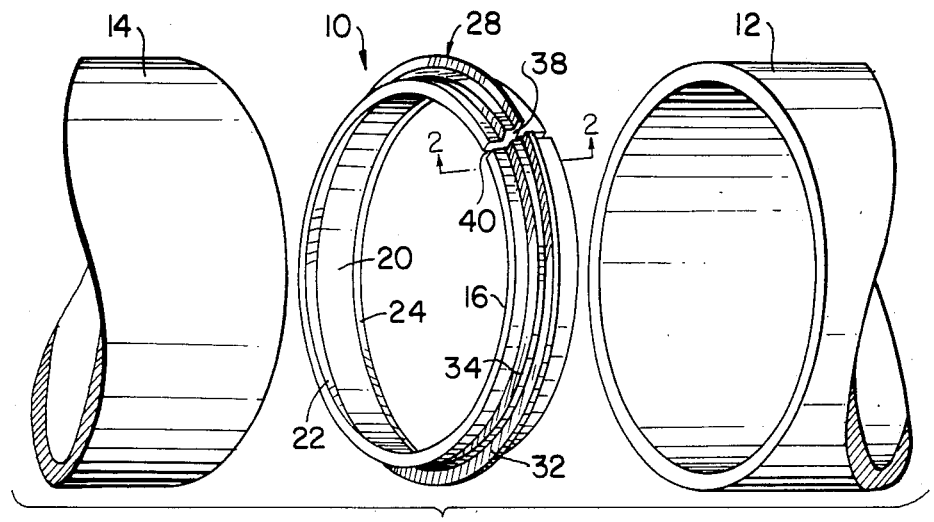
FIG. 1 is an exploded perspective view of a partially consumable spacer chill ring according to one embodiment of the present invention, showing the pipe ends to which the ring is to be connected.

Referring to the drawings in detail, and initially to FIG. 1 thereof, a partially consumable spacer chill ring 10 according to one embodiment of the present invention is interposed between the mating ends of adjacent lengths of metal pipes 12 and 14 which are to be secured together by welding.

Figure 3:
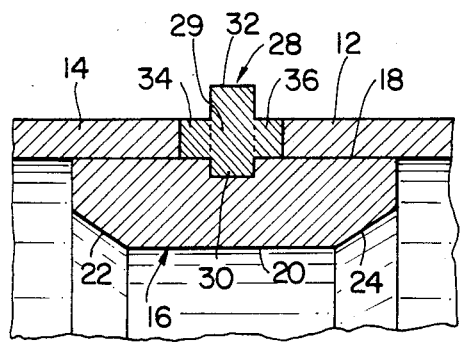
FIG. 3 is an enlarged cross-sectional view taken along line 2—2 of FIG. 1, showing the partially consumable spacer chill ring in assembled relation with the pipe ends, prior to welding.

As shown, partially consumable spacer chill ring 10 is comprised generally of a non-consumable base metal ring 16 having a substantially annular configuration, with an outer surface 18 having an outer diameter less than the inner diameters of adjacent pipes 12 and 14. Specifically, the outer diameter has dimensions such that the pipe ends can be positioned thereover in a snug fitting relation, as best shown in FIG. 3. The inner surface 20 of base metal ring 16 may include beveled sections 22 and 24 at the outer circumferential upstream and downstream edges thereof. Preferably, beveled sections 22 and 24 are inclined at an angle of approximately 15° from inner surface 20 to minimize turbulence of fluid flow after fabrication of the welded joints in the pipeline.

Base metal ring 16 is medially and circumferentially cut out to define an annular alignment groove 26. This groove may be provided in any suitable manner known to the art, for example, by machining or otherwise. As an example, annular alignment groove 26 may suitably be from about 0.01 to about 0.02 inches in depth.

Figure 2:
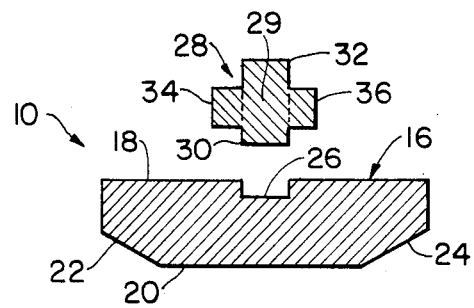
FIG. 2 is an enlarged cross-sectional view of the partially consumable spacer chill ring of FIG. 1, taken along line 2—2 thereof, showing the non-consumable base metal ring and consumable filler metal spacer ring in an exploded relationship.

Partially consumable spacer chill ring 10 also includes a consumable filler metal spacer ring 28 positioned around the outer surface 18 of base metal ring 16. Filler metal spacer ring 28 is formed of a consumable weld material which is sufficient to provide an annular weld during at least a first root pass in the welding operation. As shown in FIGS. 2 and 3, consumable spacer ring 28 has an annular configuration and a substantially inverted cross shape in cross-section. Thus, in cross-section, consumable filler metal spacer ring 28 includes a radial leg 29, also defined by the dashed lines in the Figures, having a lower end 30 which fits within groove 26. Preferably, lower end 30 has dimensions which enables it to be press fit within alignment groove 26, although the dimensions thereof may be smaller and lower end 30 could accordingly be spot welded therein. An upper end 32 of radial leg extends raidally outwardly from non-consumable ring 16 for supplying sufficient material during the first root pass.

In accordance with an aspect of the present invention, consumable filler metal spacer ring 28 includes opposed, substantially annular, transverse legs 34 and 36 which extend from radial leg 29, in the upstream and downstream directions, respectively.

Opposed transverse legs 34 and 36 serve an important function of the present invention so as to overcome deficiencies in known weld inserts. Specifically, opposed transverse leg 34 and 36 served to space apart the pipe ends by a greater distance than is normally achieved with conventional weld inserts. As a result, metal pipes 12 and 14 do not draw heat away from the root during the welding operation. This means that more heat is available during the first root pass of a welding operation, resulting in a more even flow of material since there is a more even heat distribution. Accordingly, there is a quicker melting of the weld material of consumable filler metal spacer ring 28, with less heat consumption. This results in less cracking and porosity at the weld site.

As an example, radial leg 29 may have a lengthwise dimension from lower end 30 to upper end 32 of 0.125 inch, a width of 0.0625 inch, and each transverse leg may have a widthwise dimension of 0.02–0.03 inch.

As shown in FIG. 1, base metal ring 16 and spacer ring 28 are effectively continuous, with at most small transverse slits 38 and 40, respectively, therein. Such transverse slits 38 and 40 provide a limited degree of flexibility in installation. Preferably, transverse slits 38 and 40 are radially aligned for optimum reliability in use. However, the present invention is not limited to the use of such transverse slits, which may be omitted herein.

Figure 4:
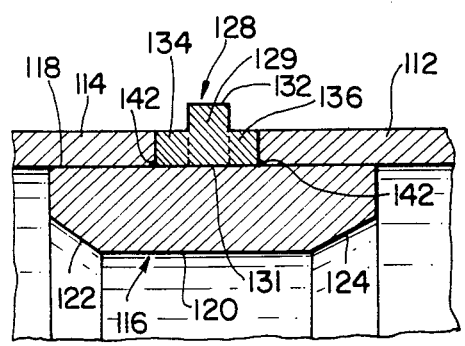
FIG. 4 is an enlarged cross-sectional view of a modified partially consumable spacer chill ring according to another embodiment of the present invention.

Referring now to FIG. 4, there is shown a modified partially consumable spacer chill ring 110 according to the present invention, in which like parts are represented by like numerals augmented by 100, and a detailed description of such like parts will be omitted herein for the sake of brevity. Basically, partially consumable spacer chill rIng 110 differs from partially consumable spacer chill ring 10 of FIGS. 1–3 by the omission of lower radial leg 30 and alignment groove 26 and thus possesses a shape in cross-section that is approximately that of an inverted "T". Thus, transverse legs 134 and 136 sit on the outer surface 118 of non-consumable base metal ring 116 and can be secured thereto by any suitable means, such as welds 142 or the like. It will be appreciated that transverse legs 134 and 136 serve to separate pipe ends 112 and 114 to a greater extent as in the embodiment of FIGS. 2 and 3, and for the same reasons.

During the welding operation with both embodiments, consumable ring 28 or 128 acts to suck the non-consumable base metal ring 16 or 116 up to pipes 12 and 14. This is caused from the difference in heat or temperature at the spacer ring and base ring. In effect, base metal ring 16 or 116 pulls heat away from the weld, and the weld draws base metal ring 16 or 116 up, somewhat like a vacuum. The heat expands base metal ring 16 or 116 and elongates the same, thereby performing an annealing operation, and base metal ring 16 or 116 does not again contract. At the same time, the root edge is burned so that the filler material from consumable ring 28 or 128 is melted, along with inner edges of the pipe ends and a small portion of non-consumable base metal ring 16 or 116 to provide an excellent weld. In addition, by utilizing the combination of the comsumable metal spacer ring and non-consumable base ring, there is a reduction or elimination of ineffective welds caused by burn-through, the formation of icicles and slag outside the pipe, or porosity in the weld.

Having described specific preferred embodiments of the invention with reference to the accompanying drawings, it will be appreciated that the present invention is not limited to those precise embodiments, and that various changes and modifications may be effected therein by one of ordinary skill in the art without departing from the scope or spirit of the invention as defined by the appended claims.

What is claimed is:

1. A partially consumable spacer chill ring for welding a pair of adjacent pipe ends together, comprising:
   a non-consumable, substantially annular, base metal ring having an outer surface with an outside diameter permitting a snug fit interiorly of the pipe ends to be welded; and
   a consumable, substantially annular, filler metal spacer ring medially attached to the outer surface of said base ring and projecting radially outwardly therefrom, for spacing apart and for welding said pipe ends together by supplying filler metal from said consumable spacer ring to the weld during a first root pass of a welding operation, said consumable filler metal ring having, in cross-section, a radial leg extending medially with respect to and radially outwardly from the outer surface of said base metal ring, and two opposite, transverse legs extending on opposite sides of said radial leg and positioned around said outer surface of said base metal ring.

2. A partially consumable spacer chill ring according to claim 1; wherein said base metal ring includes an inner surface which is beveled at at least one circumferential edge thereof.

3. A partially consumable spacer chill ring according to claim 1; wherein said consumable filler metal spacer ring has a substantially inverted "T" shape in cross-section.

4. A partially consumable spacer chill ring according to claim 1; wherein said consumable filler metal spacer ring has an inverted cross shape in cross-section.

5. A partially consumable spacer chill ring according to claim 4; wherein said outer surface of said base metal ring has a groove extending circumferentially and medially therearound for receiving a lower end of said radial leg therein such that said transverse legs are positioned on said outer surface.

6. A partially consumable spacer chill ring according to claim 1; wherein said non-consumable base metal ring is effectively continuous with at most a small transverse slit.

7. A partially consumable spacer chill ring according to claim 1; wherein said consumable filler metal ring is effectively continuous with at most a small transverse slit.

* * * * *